Nov. 4, 1969 E. K. HOWELL 3,476,918

CARD AND TAPE READER

Filed June 21, 1963 2 Sheets-Sheet 1

INVENTOR:
EDWARD K. HOWELL,

BY

HIS ATTORNEY.

Nov. 4, 1969 E. K. HOWELL 3,476,918

CARD AND TAPE READER

Filed June 21, 1963 2 Sheets-Sheet 2

INVENTOR:
EDWARD K. HOWELL,

BY Urban H. Faubion
HIS ATTORNEY.

3,476,918
CARD AND TAPE READER

Edward K. Howell, Skaneateles, N.Y., assignor to General Electric Company, a corporation of New York Filed June 21, 1963, Ser. No. 289,696
Int. Cl. G06k 7/00
U.S. Cl. 235—61.11 2 Claims

ABSTRACT OF THE DISCLOSURE

In record card or tape reading apparatus wherein a transparent record bearing area in a record is read by passing the light through the record to a pnpn switch which acts as a sensor, the signal to noise ratio is reduced by positioning an opaque obstacle with an elongated aperture through it on at least one side of the record so that the source and aperture in the obstacle and the sensing device are rectilinearly aligned and further, providing that the opaque obstacle is of a finite thickness and the aperture therethrough has walls which absorb incident light so that only the radiation directly from the source falls upon the sensor and light which diffuses through the record is eliminated.

The present invention relates to apparatus for optically reading information carried by card and tape records and more specifically relates to such apparatus wherein improved means are provided for distinguishing bits of information carried by the record.

Many presently known data processing systems include means for reading cards, tapes or other similar records which carry information by means of areas of varying transmissivity wherein an electrical output in accordance with the information is produced to be utilized in the remainder of the system. The reading means normally comprises a source of radiation, for example, visible light or infrared radiation, and a sensor adapted to be activated by radiation from the source. The sensor is connected to the utilization section and its electrical condition, provides an output in accordance with the transmission or non-transmission of radiation through the record. When a record is introduced between the source and the sensor, the condition of the information bearing area, either transmissive or non-transmissive, appropriately affects the activation of the sensor.

However, it has been found that, when the information bearing area is non-transmissive, radiation can still reach the sensor, thereby causing erroneous activation of the sensor. First, radiation may pass through base material of the record, within the area under consideration, and be diffused thereby into such a wide angle that a percentage of the diffused radiation can reach the sensor. Second, radiation may be diffusely transmitted by adjacent areas which are close to the aligned area under consideration and the transmission may be sufficient to cause some radiation to reach the sensor. The total radiation from these paths can be sufficient to activate the sensor even though a supposedly non-transmissive area is disposed between the sensor and the source aligned therewith, and an incorrect output can result. Additionally, if a plurality of information bearing areas are simultaneously read by an array of sources and sensors, cross-talk may occur between non-aligned sources and sensors.

Specifically, it has been found that some recording media allow transmission of approximately 25% through a supposedly non-transmissive area and adjacent areas when all of the factors mentioned above are considered. That is, only four times as much radiation is transmitted by a transmissive area as by a non-transmissive area. This limits the maximum variation or noise from other sources which can be tolerated to a factor less than four if the sensor condition is to be a true indication of the information carried by the record. However, both the output of the radiation source and the sensitivity of the sensor and detection circuits can vary by factors as high as two. Thus, if the power input to the source increases the source intensity by a factor of two and if the sensitivity of the sensor increases by a factor of two, for example, due to temperature change, the variation introduced by a non-transmissive area of the record will have been overcome and the sensor will respond as if the record area were transmissive thereby providing an erroneous output.

The present invention is directed to the avoidance of the above-described problems by providing means for selecting the radiation which reaches the sensor, the selection being such that radiation which has not passed directly through the information bearing area of the record under consideration without diffusion, cannot reach the sensor.

It is accordingly an object of the present invention to provide a new and improved reading apparatus for records having information recorded thereon by means of areas of varying transmissivity wherein the transmissive and non-transmissive conditions are accurately distinguished.

A further object of the present invention is the provision of new and improved reading apparatus for records having information optically recorded thereon wherein means are provided for limiting the radiation passed to the sensing device in the non-transmissive condition. Further objects and advantages of the present invention will become apparent as the description and illustration thereof proceed.

Briefly, in accordance with one form of the present invention, a record reading apparatus is provided having a source of radiation and a sensing device, for example, a lamp and a light-activted pnpn switch respectively, the source and the device being disposed on opposite sides of a record whereby radiation from the source passes through the record to the sensing device. Limiting means, for example, an opaque obstacle having an aperture therethrough, is provided on at least one side of the record and is so positioned that the source, the aperture and the sensing device are rectilinearly aligned. Radiation reaching the sensing device is thereby limited to that which has traversed a rectilinear path from the source. A specific embodiment comprises the utilization of appropriate limiting means disposed on both sides of the record to increase the precision of the apparatus.

The novel features believed characteristic of the invention are set forth in the appended claims. The invention itself, together with further objects and advantages thereof, may be best understood by reference to the following description, taken in connection with the appended drawings, in which:

The discussion throughout this specification is in terms of visible light although it is to be understood that other radiation sources may be used, with appropriate adjustments being made in the devices and materials involved so that the various elements of the system will perform the proper operation on the radiation utilized.

Figure 1:
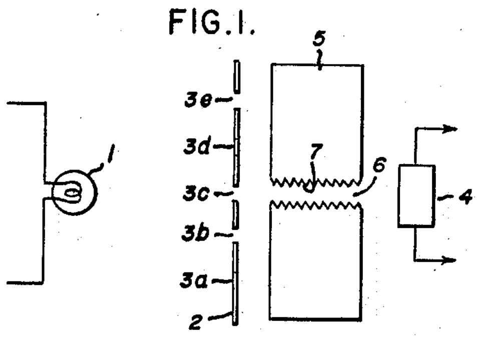
FIGURE 1 is a cross-sectional view illustrating one embodiment of the present invention.

The embodiment of the present invention illustrated in FIGURE 1 includes a radiation source illustrated by a lamp 1, a card or tape record 2 having information bearing areas 3*a*, 3*b*, 3*c*, 3*d* and 3*e* and a light activated pnpn switch 4. The lamp 1 and the switch 4 are respectively connected to a source of voltage and to the circuit which utilizes the information obtained by switch 4. For purposes of illustration, areas 3*b*, 3*c* and 3*e* are shown as apertures (holes) while 3*a* and 3*d* are shown closed. These are merely exemplary since the particular condition of each area depends on the specific information carried by the record. Furthermore, it is intended that the transmissive condition include not only punched apertures but also photographically recorded transmissive areas or any other appropriate transmissive areas. Interstitial areas of record 2 between the information bearing areas are supposedly non-transmissive, but are actually partially reflective, partially absorptive, and partially diffusely transmissive.

In accordance with the present invention, a block of opaque material such as black laminated plastic 5 having an elongated aperture 6 therein is disposed between record 2 and switch 4 to define a rectilinear path between the record and the switch. The walls 7 of aperture 6 are designed to be light absorbing so that only light which travels in a straight line from lamp 1 through area 3*c*, that is, light parallel to the axis of the aperture, can reach the switch 4. More specifically, the block 5 occupies substantially all of the space between the record and the switch so that light which passes through non-aligned areas of the record 2 will, of necessity, strike either the block itself or the internal walls of the aperture. Since the block is opaque and the walls are light absorbing, light travelling through non-aligned areas of the record will not be able to reach the switch 4. Thus, the sole determining factor for the condition of switch 4 is the state of that information bearing area, 3*c* in FIGURE 1, which is aligned with the lamp and the switch.

Figure 2:
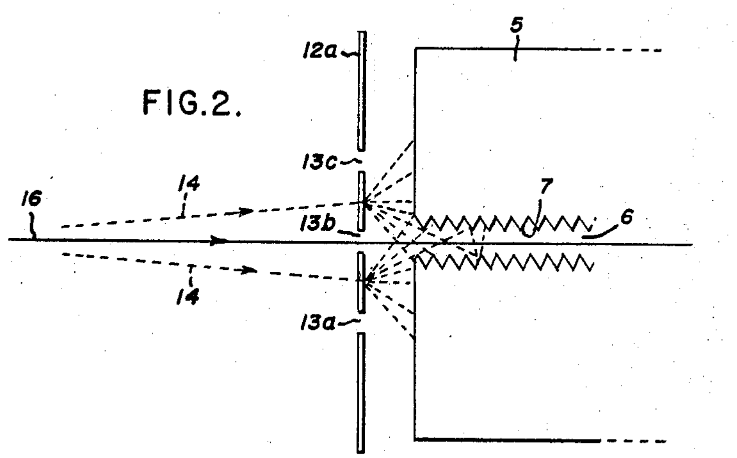
FIGURES 2 and 3 are enlarged views similar to a portion of FIGURE 1.
Figure 3:
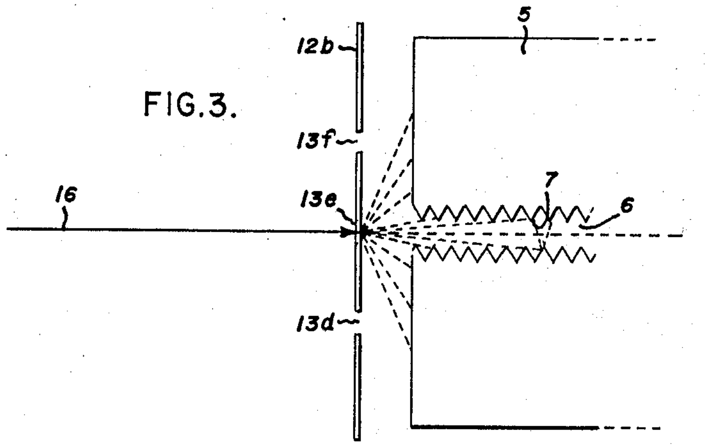

The function of the block 5 is more clearly illustrated by FIGURES 2 and 3. FIGURE 2 illustrates the path of light rays in the transmissive condition while FIGURE 3 illustrates the path of light rays in the non-transmissive condition. Records 12*a* and 12*b* in these figures are similar to record 2 except that information bearing areas 13*a*, 13*b*, 13*c*, 13*d* and 13*f* are specifically assumed to be transmissive while area 13*e* in FIGURE 3 is assumed to be non-transmissive. It is also noted that the interstitial areas are partially diffusely transmissive.

In FIGURES 2 and 3, dotted lines 14 are representative of light rays which strike supposedly non-transmissive areas of the record, and are diffused thereby. Solid line 16 represents the substantially parallel rays which are incident upon areas 13*b* and 13*e*.

It can be seen from these figures that a high percentage of the diffused rays which pass through record 2 are intercepted by the adjacent face of block 5. Since the block is composed of light absorptive material such as black laminated plastic, these rays are blocked. The rest of the diffused light enters aperture 6 and, since the block occupies substantially all of the space between the record and the switch, strikes the walls 7 and is absorbed. To prevent the possibility of any light which enters aperture 6 from being reflected through in a zig-zag fashion to the switch, the walls may be screw-threaded. Due to the screw threads, light not immediately absorbed is reflected across the diameter of the aperture rather than along its length and is quickly absorbed.

In FIGURE 2, light ray 16 extends through area 13*b*, since this is transmissive, and passes on to the switch. In FIGURE 3, area 13*e* is supposedly non-transmissive, but light ray 16 is partially transmitted with a high degree of diffusion. Thus, it is apparent that the intensity of light which reaches the switch is only a small fraction of the total light flux diffusely radiated from the record area, 13*e*. In both cases, light rays 14 are stopped by block 5 so that no undesired light can affect the switch operation.

The advantage gained by using the apertured block of the present invention is best illustrated by the following comparison of the numerical difference from the prior art. The signal-to-noise ratio without block 5 is merely the inverse of the transmission ratio K of the card. In the case mentioned above, where 25% is transmitted, the transmission ratio is 0.25 and the signal-to-noise ratio will therefore be 4. When the aperture block is used, the signal-to-noise ratio can be shown to be given by the following equation:

$$S/N=\frac{1}{4K}\left(\frac{x}{d}\right)^2$$

where $x$ is the distance from the lamp to the switch and $d$ is the diameter of the aperture in the block. Using typical numerical data, where K is 0.25, if $x$ is ½ inch and $d$ is 50 mils, the signal-to-noise ratio is increased to 100. Thus, the novel arrangement using the apertured block of the present invention can distinguish accurately the condition of the information bearing area even though there is up to 25 times as much noise as the maximum previously permissible. Higher signal-to-noise ratios can be obtained with proper adjustment of $x$ and $d$.

Figure 4:
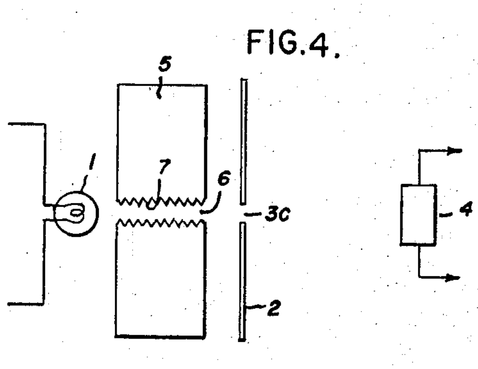
FIGURES 4 and 5 are cross-sectional views illustrating further embodiments of the present invention.

The apparatus shown in FIGURE 4 is nearly identical to that of FIGURE 1 except that, in this case, the apertured block 5 is disposed between the lamp 1 and the record 2. The effect of this embodiment is essentially the same as that of FIGURE 1 since light from lamp 1 can only reach the information bearing area 3*c* of record 2 and therefore no light can be diffused or diffracted from non-aligned areas of the record. Since the only light reaching the record 2 will be that which has traveled a path substantially parallel to the axis of the aperture, and could therefore be totally useful to the switch 4, this embodiment is preferred where the lamp emitting surface dimension is larger than the aperture diameter.

Figure 5:
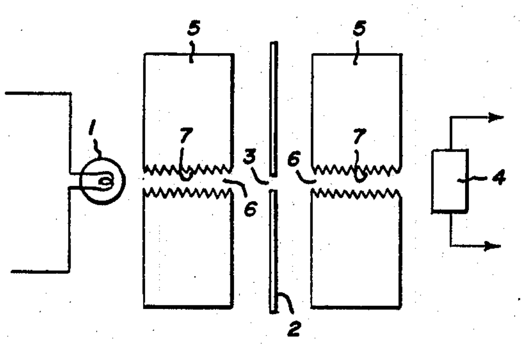

In many situations, a row or an array of switches and lamps will be used and it is important that cross-talk from adjacent information bearing areas be eliminated. As an extra precaution to insure against cross-talk in such situations, apertured blocks 5 may be disposed on each side of the record. As shown in FIGURE 5, both apertures are aligned with the source and the switch, thereby defining a single path on each side of the card by which light can travel from a lamp to its aligned switch.

Figure 6:
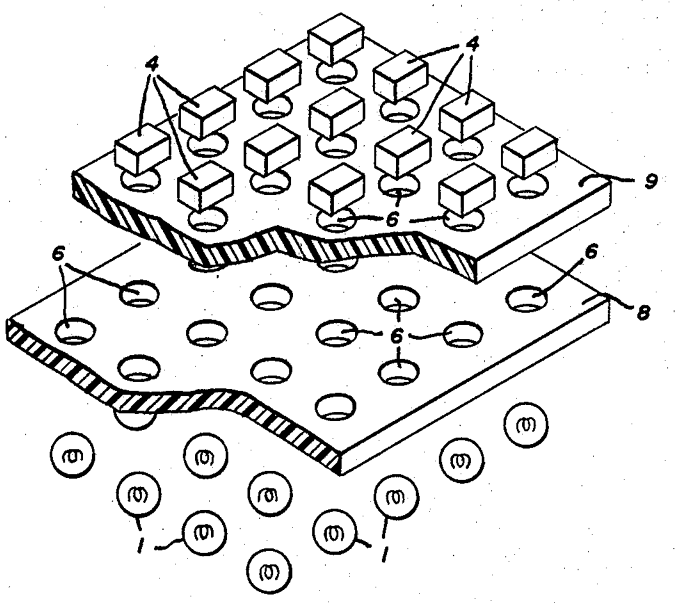
FIGURE 6 is a schematic view, generally in perspective and partially broken away, of a record reading apparatus wherein the present invention is utilized.

FIGURE 6 illustrates a complete arrangement in the nature of FIGURE 5 which may be used when, for example, it is desired to read out all information from a card simultaneously. Blocks 8 and 9 contain arrays of apertures 6 aligned with the arrays of lamps 1 and switches 4. Thus, insertion of a card and momentary activation of all of the lamps 1 results in simultaneous read out of all the bits of information carried by the card.

In certain cases wherein the source size is smaller than the aperture diameter and where cross-talk is not a problem, the aperture blocks 5 may be reduced in thickness to that which will maintain the desired opacity and dimensional stability. The aperture hole 6, then becomes much shorter than the diameter and threading is not required. The spacing $x$, from lamp to switch must be maintained, however, with the record and apertures located approximately equidistant between lamp and switch.

It can be seen from the above description that the present invention is directed to an improved reading apparatus for use in card and tape readers wherein transmitted radiation comprises the reading means, the improvement lying in the greatly increased signal-to-noise ratio. Thus, the present invention enables much more reliable readings to be made without the necessity of providing complex, expensive means for controlling ambient conditions.

The specific embodiments described herein are presented merely as examples of the various forms the practice of this invention may take. Therefore, it is intended in the appended claims to cover all modifications and variations which may come within the true spirit and scope of this invention.

What is claimed as new and desired to be secured by Letters Patent of the United States is:

1. Apparatus for reading information imposed on a record by means of areas of varying transmissivity comprising a source of radiation, a radiation sensor arranged to be activated by radiation from said source, said sensor being spaced from said source to provide a region through which the record may be moved to control the passage of radiation therebetween in accordance with the information carried by the record, and means for limiting the radiation reaching said sensor to that which has traversed a substantially linear path, said last-named means comprising a pair of opaque blocks having elongated rectilinear apertures therethrough, the walls of said apertures being radiation-absorbing, one of said blocks being disposed between said source and said region and having its aperture aligned with said source and said sensor, and the other of said blocks being disposed between said region and said sensor and having its aperture aligned with said source and said sensor.

2. Apparatus for reading information imposed on records by means of areas of varying transmissivity comprising a plurality of sources of radiation, said sources being arranged in an array, a plurality of sensors adapted to be activated by radiation from said sources, said sensors being arranged in an array corresponding to that of said sources, said sensors being juxtaposed with said sources, means for moving a record through a region intermediate said sources and said sensors whereby information-bearing areas of the record simultaneously are interposed between corresponding ones of said sources and said sensors to control the passage of radiation therebetween in accordance with the information carried by the record, and means for limiting the radiation reaching said sensors to that which has traversed a substantially linear path from the corresponding source, said last-mentioned means comprising a pair of opaque blocks, each of said blocks having a plurality of rectilinear apertures therethrough, said apertures in each of said blocks being arranged in arrays corresponding to said array of said sources, the walls of said apertures being radiation-absorbing, one of said blocks being disposed between said source and said region and having the apertures therein aligned with said sources and said sensors, and the other of said blocks being disposed between said region and said sensors and having the apertures therein aligned with said sources and said sensors.

References Cited

UNITED STATES PATENTS

| | | | |
|---|---|---|---|
| 2,341,934 | 2/1944 | Martin | 179—27 |
| 2,966,092 | 12/1960 | Hartridge | 88—14 |
| 3,196,279 | 7/1965 | Papelian | 250—237 |
| 2,916,624 | 12/1959 | Angel | 250—219 |
| 3,064,887 | 11/1962 | Waters | 235—61.11 |
| 3,253,128 | 5/1962 | Wu Chen | 235—61.11 |

MAYNARD R. WILBUR, Primary Examiner

G. R. EDWARDS, Assistant Examiner